(12) United States Patent
Shin et al.

(10) Patent No.: US 10,178,283 B2
(45) Date of Patent: Jan. 8, 2019

(54) DOME CAMERA DEVICE

(71) Applicant: Hanwha Techwin Co., Ltd., Changwon-si (KR)

(72) Inventors: Hyun Soo Shin, Changwon-si (KR); Nam Il Kim, Changwon-si (KR); Eun Soo Choi, Changwon-si (KR)

(73) Assignee: HANWHA TECHNWIN CO., LTD., Changwon-si (KR)

( * ) Notice: Subject to any disclaimer, the term of this patent is extended or adjusted under 35 U.S.C. 154(b) by 0 days.

(21) Appl. No.: 15/503,969

(22) PCT Filed: Feb. 16, 2015

(86) PCT No.: PCT/KR2015/001529
§ 371 (c)(1),
(2) Date: Jul. 10, 2017

(87) PCT Pub. No.: WO2016/024678
PCT Pub. Date: Feb. 18, 2016

(65) Prior Publication Data
US 2017/0353635 A1    Dec. 7, 2017

(30) Foreign Application Priority Data

Aug. 14, 2014 (KR) .......................... 10-2014-0106036

(51) Int. Cl.
*H04N 5/225* (2006.01)
*H04N 7/18* (2006.01)

(52) U.S. Cl.
CPC ............. *H04N 5/2252* (2013.01); *H04N 7/18* (2013.01); *H04N 7/183* (2013.01)

(58) Field of Classification Search
CPC .............................. H04N 5/2252; H04N 7/183
See application file for complete search history.

(56) References Cited

U.S. PATENT DOCUMENTS

| 8,764,318 | B2* | 7/2014 | Wada | ................... | H04N 5/2252 |
| | | | | | 348/143 |
| 2004/0100563 | A1* | 5/2004 | Sablak | ................... | H04N 7/183 |
| | | | | | 348/211.4 |
| 2006/0017842 | A1* | 1/2006 | Jun | ........................ | G03B 37/02 |
| | | | | | 348/373 |

(Continued)

FOREIGN PATENT DOCUMENTS

CN    201987073 U    9/2011
JP    9-181942 A    7/1997

(Continued)

OTHER PUBLICATIONS

International Search Report dated Apr. 22, 2015 issued by the International Searching Authority in counterpart International Application No. PCT/KR2015/001529 (PCT/ISA/210).

(Continued)

*Primary Examiner* — Amy R Hsu
(74) *Attorney, Agent, or Firm* — Ladas & Parry LLP

(57) ABSTRACT

Provided is a dome camera including a housing part configured to accommodate a camera and rotate in multiple directions; a connection cover part configured to cover at least part of the housing part; a first rotation restricting part configured to limit a rotation range of the housing part in a first rotation direction; and a second rotation restricting part configured to limit a rotation range of the housing part in a second rotation direction.

23 Claims, 8 Drawing Sheets

(56) References Cited

U.S. PATENT DOCUMENTS

| | | | |
|---|---|---|---|
| 2008/0008467 A1* | 1/2008 | Liu | G03B 17/02 396/427 |
| 2010/0128122 A1* | 5/2010 | Wright | G03B 17/00 348/143 |
| 2010/0139290 A1 | 6/2010 | Leblond | |
| 2012/0182472 A1* | 7/2012 | Inata | G03B 5/00 348/374 |
| 2013/0287385 A1* | 10/2013 | Andersson | H04N 5/2252 396/427 |
| 2013/0321697 A1* | 12/2013 | Kang | G02B 5/005 348/373 |
| 2014/0028844 A1* | 1/2014 | Osawa | H04N 5/23287 348/143 |
| 2014/0354836 A1* | 12/2014 | Takizawa | G03B 5/00 348/208.11 |

FOREIGN PATENT DOCUMENTS

| | | |
|---|---|---|
| JP | 2008-83551 A | 4/2008 |
| JP | 2008-175964 A | 7/2008 |
| JP | 2010-262177 A | 11/2010 |
| JP | 2011-48249 A | 3/2011 |
| KR | 20-016842 Y1 | 1/2000 |
| KR | 10-0492121 B1 | 6/2005 |
| KR | 20-0390350 Y1 | 7/2005 |
| KR | 10-0958408 B1 | 5/2010 |
| KR | 10-2010-0065897 A | 6/2010 |
| KR | 10-2010-0067704 A | 6/2010 |
| KR | 10-2011-0109874 A | 10/2011 |
| KR | 10-2013-0077573 A | 7/2013 |
| KR | 10-1312437 B1 | 9/2013 |
| KR | 10-2013-0111499 A | 10/2013 |
| KR | 10-2013-0119703 A | 11/2013 |
| WO | 2014/076957 A1 | 5/2014 |

OTHER PUBLICATIONS

Chinese Office Action dated Aug. 2, 2018; Appln. No. 201510156235.4.

* cited by examiner

DOME CAMERA DEVICE

CROSS-REFERENCE TO THE RELATED APPLICATION

This application is a National Stage of International Application No. PCT/KR2015/001529, filed Feb. 16, 2015, which claims priority from Korean Patent Application No. 10-2014-0106036, filed on Aug. 14, 2014, in the Korean Intellectual Property Office, the disclosures of which are incorporated herein in their entirety by reference.

BACKGROUND

In general, surveillance cameras are installed at places that require security, such as offices, hospitals, banks and public buildings for access control and crime prevention. These days, many surveillance cameras are installed around parking lots, roads, and residential areas where various accidents and crimes occur frequently.

Various forms of surveillance cameras, such as linear cameras and dome cameras, are used depending on the installation site and purpose of use. In particular, a dome camera with a clear dome that wraps a camera to prevent the camera lens from being exposed is widely used.

In the clear dome, a camera for photographing a subject is accommodated. The camera is connected to an external device by cables and transmits photographed image information to the external device through the cables. The clear dome rotates in a pan direction (horizontal direction), a tilt direction (vertical direction), and a rotate direction (left or right direction), thereby enlarging the photographing range of the camera.

As such clear dome may pan, tilt and rotate infinitely, the cables connected to the camera may get entangled and twisted.

SUMMARY

To address the aforementioned problems, one or more exemplary embodiments provide a dome camera device which limits the rotation range of a housing part in which a camera is accommodated.

However, aspects of the inventive concept are not restricted to the exemplary embodiments set forth herein. The above and other aspects of the inventive concept will become more apparent to one of ordinary skill in the art to which the inventive concept pertains by referencing the detailed description of the inventive concept given below.

According to an exemplary embodiment, there is provided a dome camera device including a housing part configured to accommodate a camera and rotate in multiple directions; a connection cover part configured to cover at least part of the housing part; a first rotation restricting part configured to limit a rotation range of the housing part in a first rotation direction; and a second rotation restricting part configured to limit a rotation range of the housing part in a second rotation direction.

The first rotation restricting part may include: a guide slot which is formed on the housing part along the first rotation direction; and a guide protrusion which protrudes from an inner side of the connection cover part and is inserted into the guide slot in a slidable manner.

The first rotation restricting part may further include a step portion including protrusions formed respectively at both ends of the guide slot.

The guide slot may include two slots formed respectively on opposite sides of the housing part, and the guide protrusion may include two protrusions formed respectively on opposite sides of the connection cover part.

A virtual line connecting the protrusions of the guide protrusion crosses a rotation axis of the housing part rotating in the first rotation direction.

The step portion extends outward from the housing part.

The first rotation restricting part may include: a guide slot which is formed on the connection cover part along the first rotation direction; and a guide protrusion which protrudes from an outer side of the housing part and is inserted into the guide slot in a slidable manner.

The first rotation restricting part may include a step portion including protrusions formed respectively at both ends of the guide slot.

The second rotation restricting part may include: stoppers which are spaced apart and protrude from a rear surface of the housing part; and stopping protrusions configured to respectively catch the stoppers such that the housing part does not rotate in the second direction beyond a predetermined range.

The stoppers may include a first stopper which limits a range of forward rotation of the housing part rotating in the second rotation direction and a second stopper which is separated from the first stopper and limits a range of reverse rotation of the housing part rotating in the second direction.

The stopping protrusions may include: a first stopping protrusion which is disposed at a front of the connection cover part and configured to catch the first stopper; and a second stopping protrusion which is disposed at a rear of the connection cover part and configured to catch the second stopper.

The dome camera device may further include: a base cover part configured to cover at least part of the connection cover part; and a base frame part covered by the base cover part and configured to support the connection cover part.

A movable groove is formed in an inner surface of the base cover part along a third rotation direction.

A movable protrusion is formed on an outer surface of the connection cover part and is inserted into the movable groove in a slidable manner.

The dome camera device may further include a rotation driving part which is configured to rotate the housing part in at least one of the first rotation direction and the second rotation direction.

The rotation driving part may include a recessed portion into which the housing part is inserted.

A fixing protrusion extending outwards is formed on a circumference of the rotation driving part.

The connection cover part may include a fixing groove into which the fixing protrusion is inserted, thereby coupling the rotation driving part to the connection cover part.

The housing part forms a cable connection hole through which a cable connected to the camera penetrates.

Heat dissipation holes are formed on the housing part such that heat generated by the camera is dissipated.

According to an aspect of the inventive concept, there is provided a housing part which accommodates a camera for photographing a subject; a connection cover part which covers at least part of a circumference of the housing part; a first rotation restricting part which limits a rotation range of the housing part in a first rotation direction; and a second rotation restricting part which limits the rotation range of the housing part in a second rotation direction.

A dome camera device according to the inventive concept may prevent a cable connected to a dome camera device from being twisted by limiting the rotation range of the dome camera device in a rotate direction (first rotation direction) and a tilt direction (second rotation direction).

However, the effects of the inventive concept are not restricted to the one set forth herein. The above and other effects of the inventive concept will become more apparent to one of daily skill in the art to which the inventive concept pertains by referencing the claims.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

The inventive concept will now be described more fully hereinafter with reference to the accompanying drawings, in which the exemplary embodiments are shown. The inventive concept may, however, be embodied in different forms and should not be construed as limited to the exemplary embodiments set forth herein. Rather, these exemplary embodiments are provided so that this disclosure will be thorough and complete, and will fully convey the scope of the inventive to those skilled in the art. The same reference numbers indicate the same components throughout the specification. In the attached figures, the thickness of layers and regions is exaggerated for clarity.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising." "having," "including," and "containing" are to be construed as open-ended terms (i.e., meaning "including, but not limited to,") unless otherwise noted.

Spatially relative terms, such as "beneath." "below," "lower." "above." "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
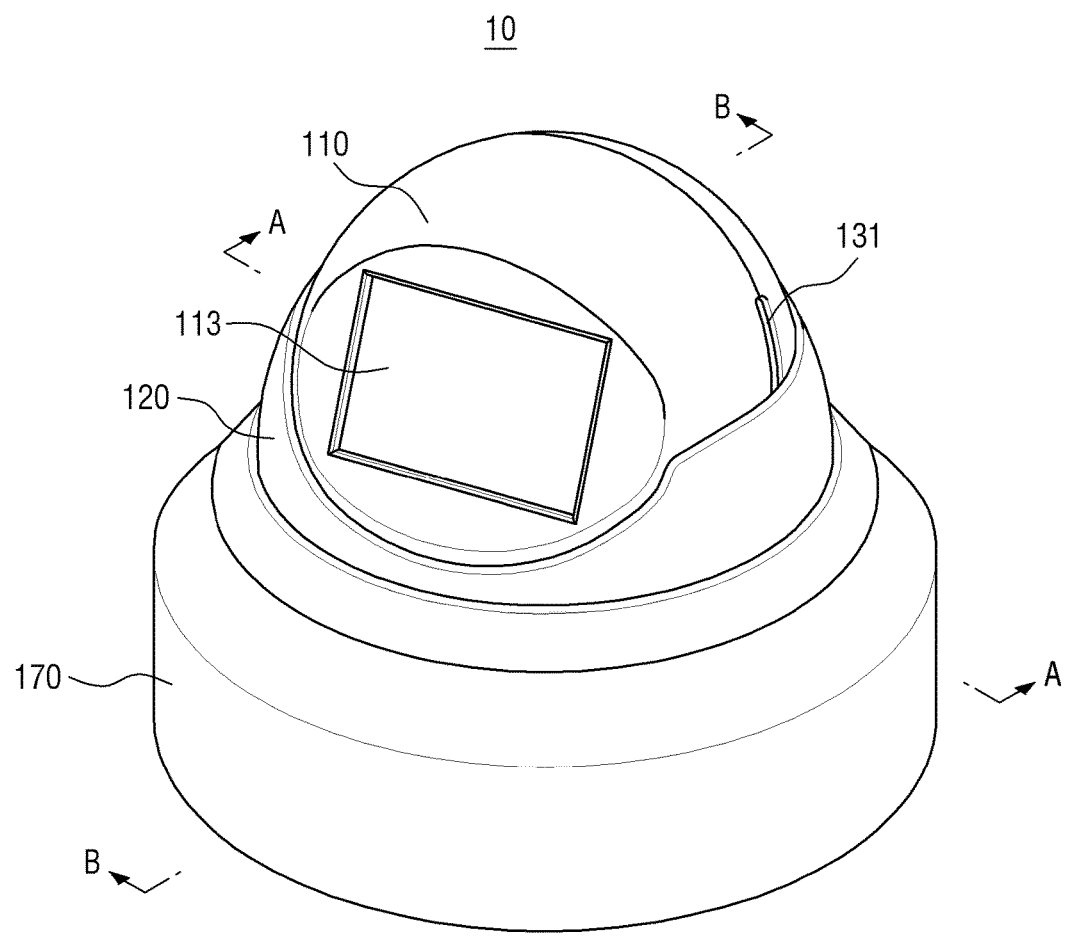
FIG. 1 is a perspective view of a dome camera device according to an exemplary embodiment.
Figure 2:
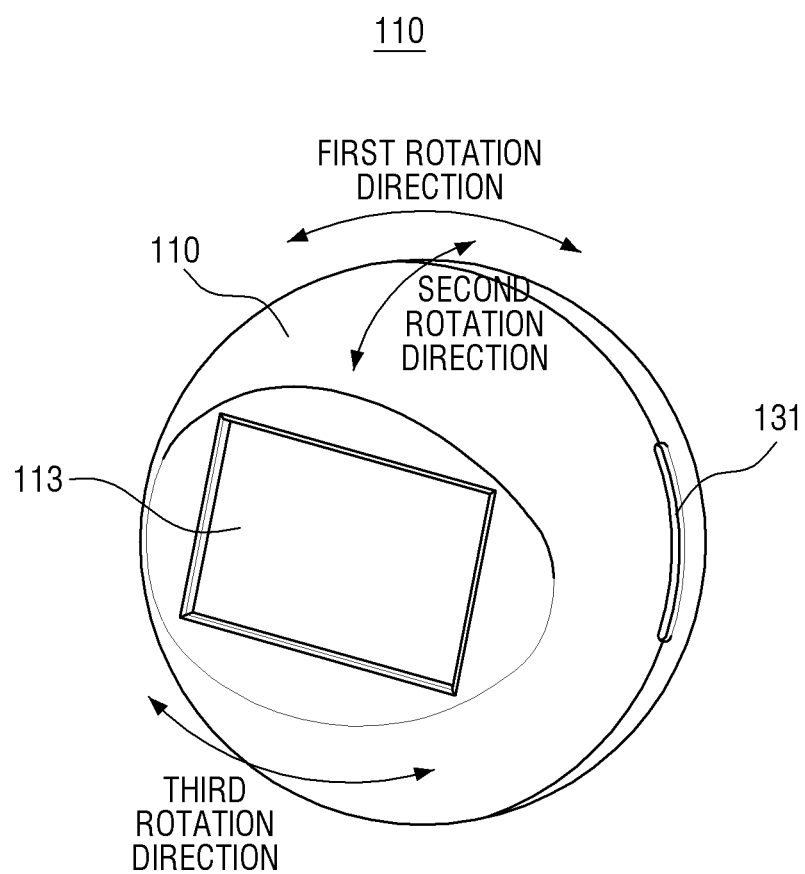
FIG. 2 is a perspective view of a housing part of a dome camera device according to an exemplary embodiment.

FIG. 1 is a perspective view of a dome camera device according to an exemplary embodiment. FIG. 2 is a perspective view of a housing part of a dome camera device according to an exemplary embodiment.

Referring to FIGS. 1 and 2, the dome camera device 10 may include a housing part 110 and a connection cover part 120. In addition, the dome camera device may further include a base cover part 170.

The housing part 110 is a component for accommodating a camera that photographs a subject. That is, the housing part 110 is a component for protecting the camera from external dust, moisture, and the like. In an example, the camera may be fixed to a certain extent in a space formed in the housing part 110.

The housing part 110 may have a transparent window 113 at a position corresponding to a lens of the camera. Accordingly, the camera housed in the housing part 110 can take a picture of a subject through the transparent window 113.

The housing part 110 may have a spherical shape. However, a portion where the transparent window 113 is formed may be formed to correspond to the shape of the transparent window. For example, when the transparent window 113 is formed flat, the portion of the housing part 110 where the transparent window is formed may be formed flat.

The housing part 110 may include the transparent window on the front side, and a cable connected to the camera housed inside the housing part is connected to the rear side. In addition, at least part of the circumference of the housing part 110 may be covered by the connection cover part 120.

The connection cover part 120 is connected to the housing part 110 by covering at least part of the circumference of the housing part 110. The connection cover part 12 may be formed in a cylindrical shape.

The base cover part 170 may partially cover a base frame part 160 (see FIG. 3), a rotation driving part 150 (see FIG. 3) and the connection cover part 120 to be described later and protects them from external impacts and foreign substances. The guide slot 131 will be described later in reference to FIGS. 3 and 5.

Figure 3:
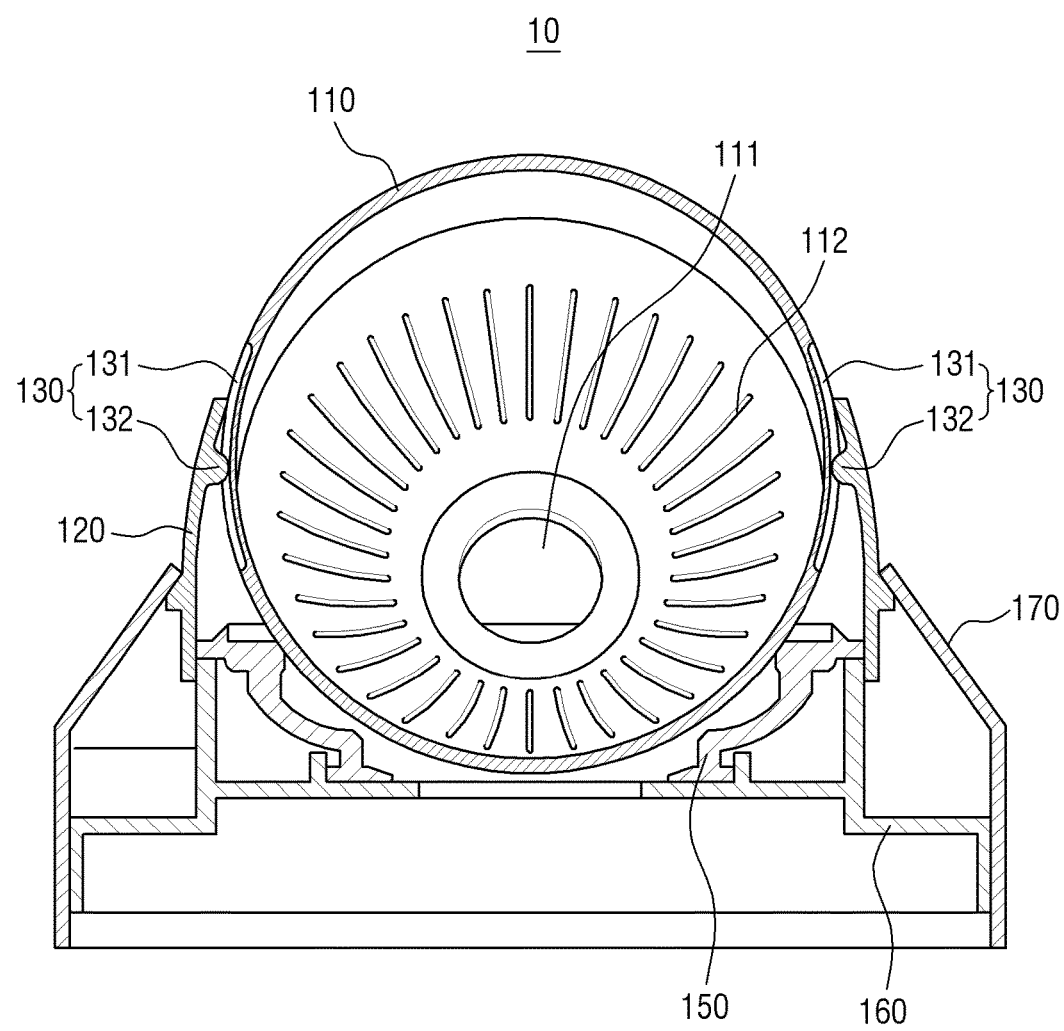
FIG. 3 is a cross-sectional view of section A-A of a dome camera device of FIG. 1.
Figure 4:
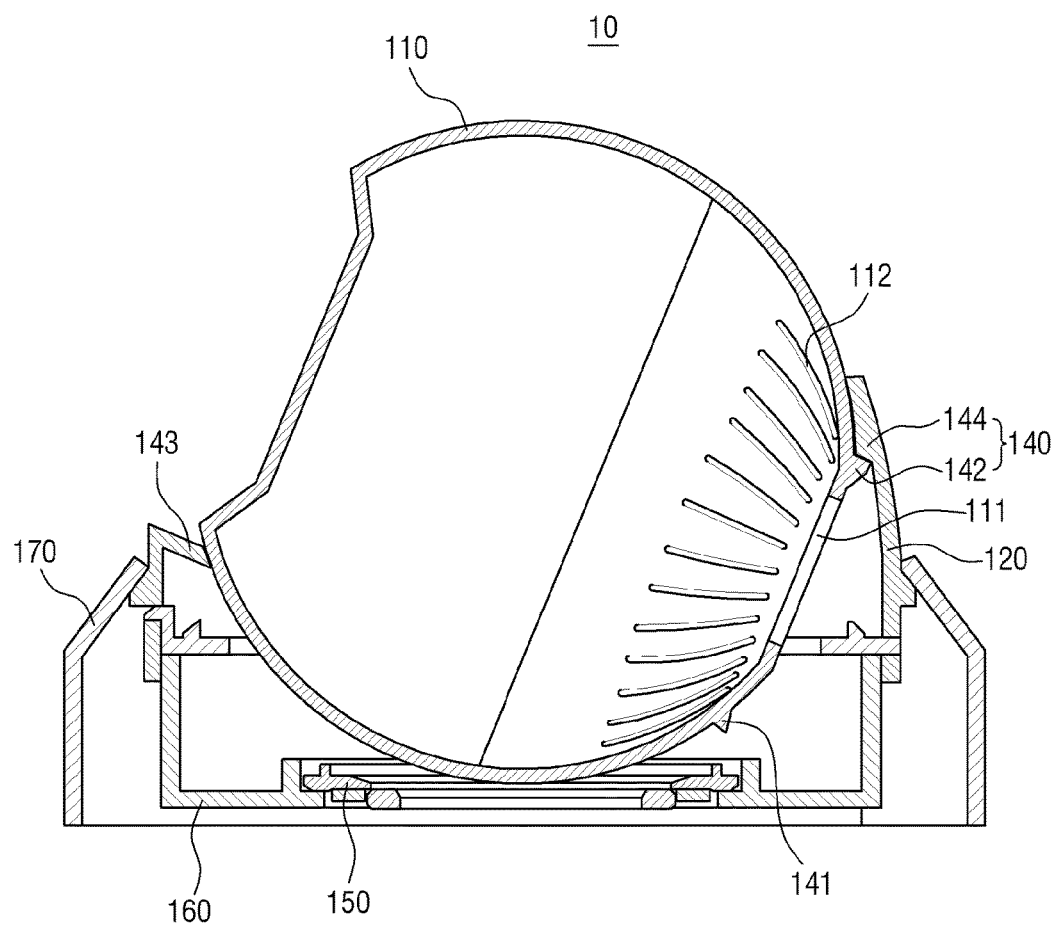
FIG. 4 is a cross-sectional view of section B-B of a dome camera device of FIG. 1.

FIG. 3 is a cross-sectional view of section A-A of a dome camera device of FIG. 1. FIG. 4 is a cross-sectional view of section B-B of a dome camera device of FIG. 1.

Referring to FIGS. 3 and 4, the dome camera device 10 may include the housing part 110, the connection cover part 120, a first rotation restricting part 130, and a second rotation restricting part 140. The dome camera device 10 may further include the rotation driving part 150, the base cover part 170, and the base frame 160.

A redundant description of components identical to those of FIGS. 1 and 2 will be omitted.

The housing part 110 may be connected to and supported by the rotation driving part 150. In addition, the housing part 110 may be rotated in at least one of a first rotation direction, a second rotation direction and a third rotation direction by the rotation driving part 150.

Here, the first rotation direction is a rotate direction, the second rotation direction is a tilt direction, and the third rotation direction is a pan direction. For example, the first rotation direction may be a left-right rotation direction of the housing part 110, the second rotation direction may be a vertical rotation direction of the housing part 110, and the third rotation direction may be a horizontal rotation direction of the housing part 110.

The housing part 110 may have a cable connection hole 111, through which a cable passes. The cable hole 111 may be formed at a position adjacent to a cable connection port of the camera. For example, the housing part 110 may have the cable connection hole 111 in a rear surface. In addition, the cable connection hole 111 may be, but is not limited to, circular.

The housing part 110 may have heat dissipation holes 112 for dissipating heat generated when the camera photographs a subject. For example, the heat dissipation holes 112 for dissipating internal heat to the outside may be formed in the rear surface of the housing part 110 in an area adjacent to the cable connection hole 111. In addition, a cooling fan may be provided inside the housing part 110, and the heat inside the housing part 110 can be rapidly discharged to the outside through the heat dissipation holes 112 by the operation of the cooling fan.

The connection cover part 120 may cover at least part of the circumference of the housing part 110 and may be supported by the base frame part 160. The connection cover part 120 may be connected to the rotation driving part 150 to rotate in the third rotation direction (i.e., the pan direction) along with the housing part 110.

A portion of the connection cover part 120 may be inserted into the base cover part 170. A movable protrusion may be formed to protrude along the circumference of the connecting cover part 120. The movable protrusion of the connection cover part 120 may be inserted into a movable groove formed in the base cover part 170 in a slidable manner. Accordingly, the rotation range of the connection cover part 120 in the third rotation direction may be limited by the groove. Specifically, when the connection cover part 120 is rotated in the third rotation direction by the rotation driving part 150, the movable protrusion moves in the third rotation direction along the movable groove. However, when the movable protrusion reaches an end of the movable groove, the movable protrusion cannot move further in the third rotating direction. Accordingly, the connection cover part 120 can no longer rotate in the third rotating direction.

The first rotation restricting part 130 limits the rotation range of the housing part 110 in the first rotation direction (i.e., the rotate direction). The first rotation restricting part 130 may include a guide slot 131 and a guide protrusion 132 inserted into the guide slot 131 in a slidable manner.

The guide slot 131 may be recessed on both sides of the housing part 110. Hereinafter, "both sides" denote two substantially opposite sides. For example, the guide slot 131 may be formed on left and right sides of the housing part 110. Specifically, the guide slot 131 may extend along the first rotation direction and may have a predetermined depth into the housing part 110. Accordingly, the guide protrusion 132 can be inserted into the guide slot 131 and slide along the guide slot 131 in the first rotation direction or relatively rotate in place.

Here, when the guide protrusion 132 relatively rotates, it does not mean that the guide protrusion 132 rotates in the guide slot 131 by itself but it means that the guide protrusion 132 relatively rotates as compared with the housing part 110 when the housing part 110 rotates in the second rotation direction. That is, the guide protrusion 132 may be inserted into the guide slot 131 and serve as a rotation axis of the second rotation direction.

The first rotation restricting part 130 may include a step portion for restricting the sliding movement of the guide protrusion 132 at both ends of the guide slot 131. The step portion may be located at both ends of the guide slot 131 and extend outward. Accordingly, when the housing part 110 rotates rapidly in the first rotation direction, the step portion can prevent the guide protrusion 132 from deviating from the guide slot 131.

The guide protrusion 132 may be formed on the connection cover part 120 and located at a position corresponding to the guide slot 131. For example, the guide protrusion 132 may be located on both sides of the connection cover part 120. In addition, the guide protrusion 132 may protrude inwards to be inserted into the guide slot 131. Accordingly, the guide protrusion 132 may limit the rotation range of the housing part 110 in the first rotation direction to the length of the guide slot 131. That is, the guide protrusion 132 may serve as a stopper. In addition, the guide protrusion 132 may protrude such that a tip of the guide protrusion 132 is in point contact with the guide slot 131.

In an exemplary embodiment, the guide protrusion 132 may be formed on each of both sides of the connection cover part 120 such that a virtual line connecting two guide protrusions 132 on both sides of the connection cover part 120 crosses a virtual rotation axis of the housing part 110 rotating in the first rotation direction. However, the inventive concept is not limited to this case.

Here, the guide protrusion 132 may be integrally formed with the connection cover part 120, and the guide slot 131 may also be integrally formed with the housing part 110.

The second rotation restricting part 140 may limit the rotation range of the housing part 110 in the second rotation direction (i.e., the tilt direction). The second rotation restricting part 140 may include stoppers 141 and 142 and stopping protrusions 143 and 144 on which the stoppers 141 and 142 are caught.

The stoppers 141 and 142 may be formed on the rear surface of the housing part 110. The stoppers 141 and 142 may be formed in an area adjacent to the cable connection hole 111 described above and may protrude outward.

The stoppers 141 and 142 may include a first stopper 141 and a second stopper 142. The first stopper 141 may limit the range of forward rotation of the housing part 110 rotating in the second rotation direction. In addition, the second stopper 142 may be spaced apart from the first stopper 141 and limit the range of reverse rotation of the housing part 110 rotating in the second rotation direction.

For example, the stopper 141 may be formed under the cable connection hole 111 formed in the rear surface of the housing part 110, and the second stopper 142 may be formed above the cable connection hole 111. Here, the forward rotation denotes a clockwise direction, and the reverse rotation denotes a counterclockwise direction.

The stopping protrusions 143 and 144 may protrude inward from the connection cover part 120. Therefore, when the housing part 110 rotates in the second rotation direction, the stoppers 141 and 142 formed on the housing part 110 may be caught on the stopping protrusions 143 and 144, respectively. Accordingly, the rotation range of the housing portion 110 in the second rotation direction can be limited.

The stopping protrusions 143 and 144 may include a first stopping protrusion 143 and a second stopping protrusion 144. The first stopping protrusion 143 may be located at the front of the connecting cover part 120 such that the first stopper 141 is caught on the first stopping protrusion 143. The second stopping protrusion 144 may be located at the rear of the connection cover part 120, and the second stopper 142 may be caught on the second stopping protrusion 144.

In an exemplary embodiment, the stoppers 141 and 142 may be integrally formed with the housing part 110, and the stopping protrusions 143 and 144 may be integrally formed with the connection cover part 120.

The rotation driving part 150 may rotate the housing part 110 in at least one of the first rotation direction (i.e., the rotate direction) and the second rotation direction (i.e., the tilt direction). In addition, the rotation driving part 150 may rotate the housing part 110 and the connection cover part 120 simultaneously in the third rotation direction (i.e., the pan direction). Accordingly, the rotation driving part 150 can freely rotate the housing part 110 in one of the first rotation direction, the second rotation direction and the third rotation direction. As a result, the camera housed in the housing part 110 which moves together with the housing part 110 may photograph a subject at various angles.

The rotation driving part 150 may form a recessed portion into which the housing part 110 is inserted, and a fixing protrusion extending outwards may be formed on the circumference of the rotation driving part 150. The fixing protrusion may be inserted into a fixing groove formed in the connection cover part 120 to couple the rotation driving part 150 to the connection cover part 120. The rotation driving part 150 may be positioned on the base frame part 160 and supported by the base frame part 160.

The base frame part 160 may also support the housing part 110 and the connection cover part 120.

The base frame part 160 is closely attached to a wall or ceiling to fix the dome camera device 10 in a specific position. To this end, the base frame part 160 may include a coupling hole through which a coupling member penetrates. The coupling member such as a screw or a nail may be inserted into a wall or a ceiling through the coupling hole, thereby closely fixing the base frame part 160 to the wall or the ceiling.

The base cover part 170 may cover the base frame part 160, the rotation driving part 150 and part of the connection cover part 120, to protect them from external impacts and foreign substances as described above.

As aforementioned, a movable groove may be formed in an inner surface of the base cover part 170, and a movable protrusion of the connection cover part 120 may inserted into the movable groove such that the movable protrusion slides along the movable groove. To this end, the movable groove may be located at a position corresponding to the movable protrusion of the connection cover part 120. For example, the movable groove may be formed on the inner surface of the base cover part 170 along the third rotation direction and limit the rotation range of the connection cover part 120 in the third rotation direction. Accordingly, the rotation range of the housing part 110 in the third rotation direction may also be limited because the housing part 110 is connected to and rotates in the third rotation direction together with the connection cover part 120.

Figure 5:
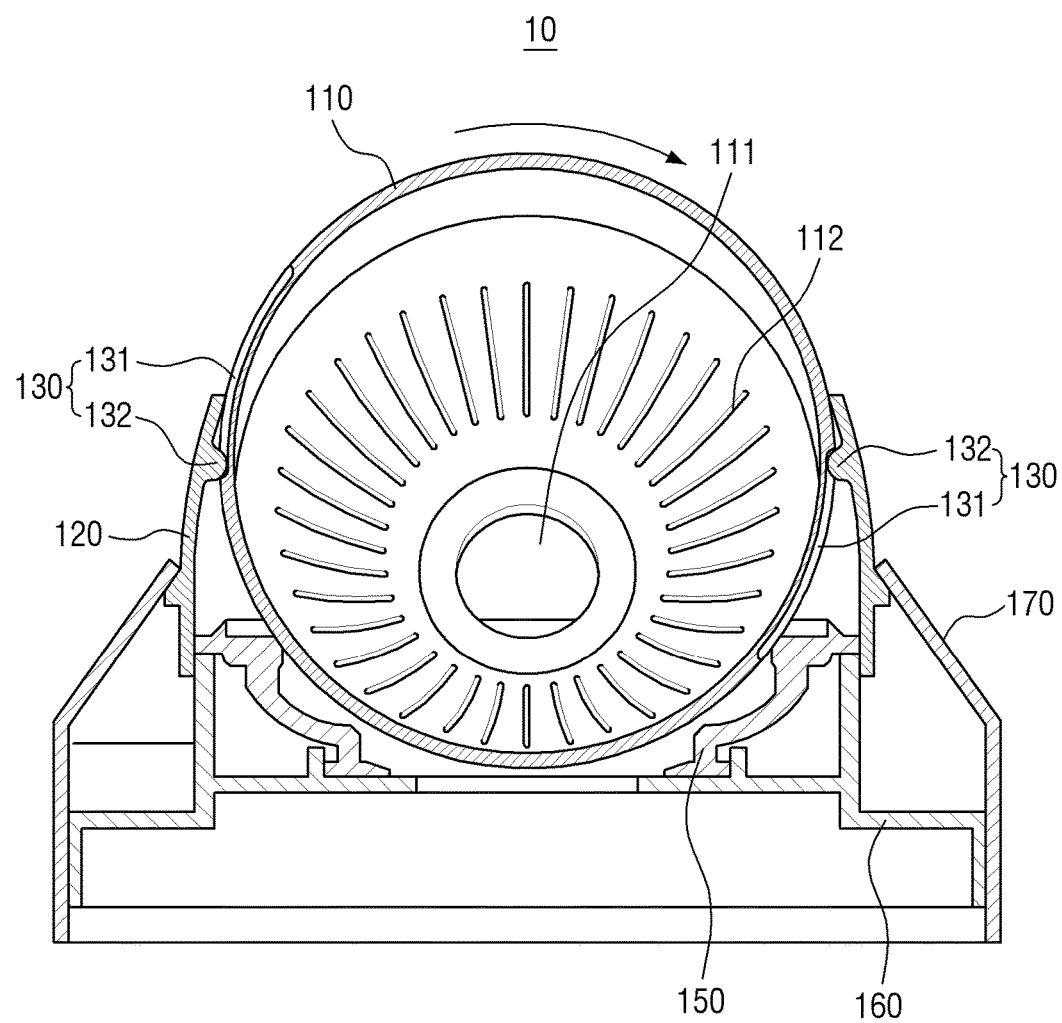
FIG. 5 is a cross-sectional view illustrating a dome camera device in which a rotation range of a housing part in a first rotation direction is limited, according to an exemplary embodiment.

FIG. 5 is a cross-sectional view illustrating a dome camera device in which a rotation range of a housing part in a first rotation direction is limited, according to an exemplary embodiment.

Referring to FIG. 5, the housing part 110 may rotate in the first rotation direction when receiving a rotational driving force in the first rotation direction (i.e., the rotate direction) from the rotation driving part 150. However, as described above, the rotation range of the housing part 110 in the first rotation direction is limited by the guide slot 131 and the guide protrusion 132 of the first rotation restricting part.

For example, the housing part 110 can be rotated within a specific angle range defined by the guide slot 131 formed on both sides of the housing part 110 and the guide protrusion 132 formed on both sides of the connection cover part 120. That is, the rotation range of the housing part 110 in the first rotation direction is limited. Specifically, when the housing part 110 is rotated by a predetermined angle in the first rotation direction, the guide protrusion 132 is caught on an end of the guide slot 131. Accordingly, the housing part 110 cannot rotate further in the same direction.

Figure 6:
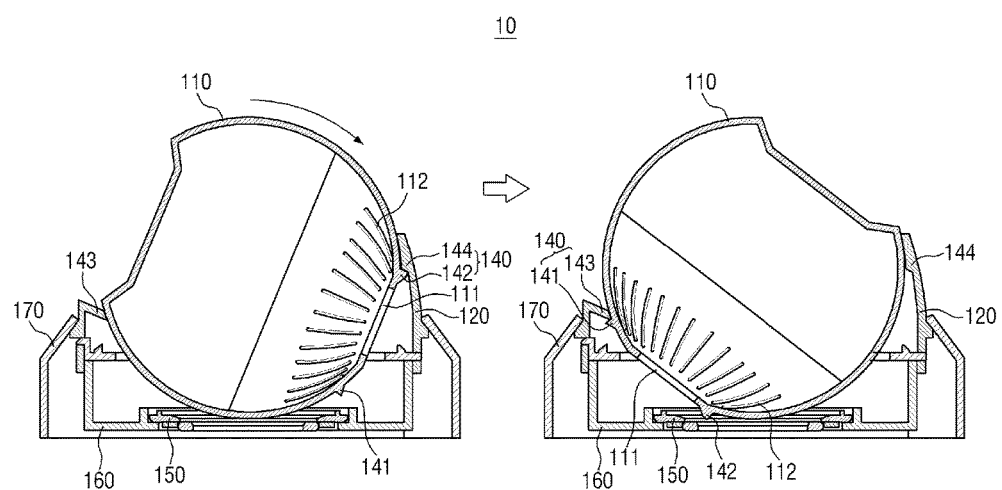
FIG. 6 is a cross-sectional view illustrating a dome camera device in which a rotation range of a housing part in a second rotation direction is limited, according to an exemplary embodiment.

FIG. 6 is a cross-sectional view illustrating a dome camera device in which a rotation range of a housing part in a second rotation direction is limited, according to an exemplary embodiment.

Referring to FIG. 6, the housing part 110 may rotate in the second rotation direction when receiving a rotational driving force in the second rotation direction (i.e., the tilt direction) from the rotation driving part 150. However, the housing part 110 can be rotated only within a specific angle range defined by the stoppers 141 and 142 formed on the rear surface of the housing part 110 and the stopping protrusions 143 and 144 formed on the connection cover part 120. That is, the rotation range of the housing part 110 in the second rotation direction is limited.

For example, when the housing part 110 keeps rotating forward, the first stopper 141 formed on the housing part 110 may be caught on the first stopping protrusion 143 formed on the connection cover part 120 at some point. Accordingly, the housing part 110 can no longer rotate forward in the second rotation direction beyond that point.

In addition, when the housing part 110 keeps rotating reversely in the second rotation direction, the second stopper 142 formed on the housing part 110 may be caught on the second stopping protrusion 144 formed on the connection cover part 120 at some point. Accordingly, the housing part 110 can no longer rotate reversely in the second rotation direction beyond that point.

Figure 7:
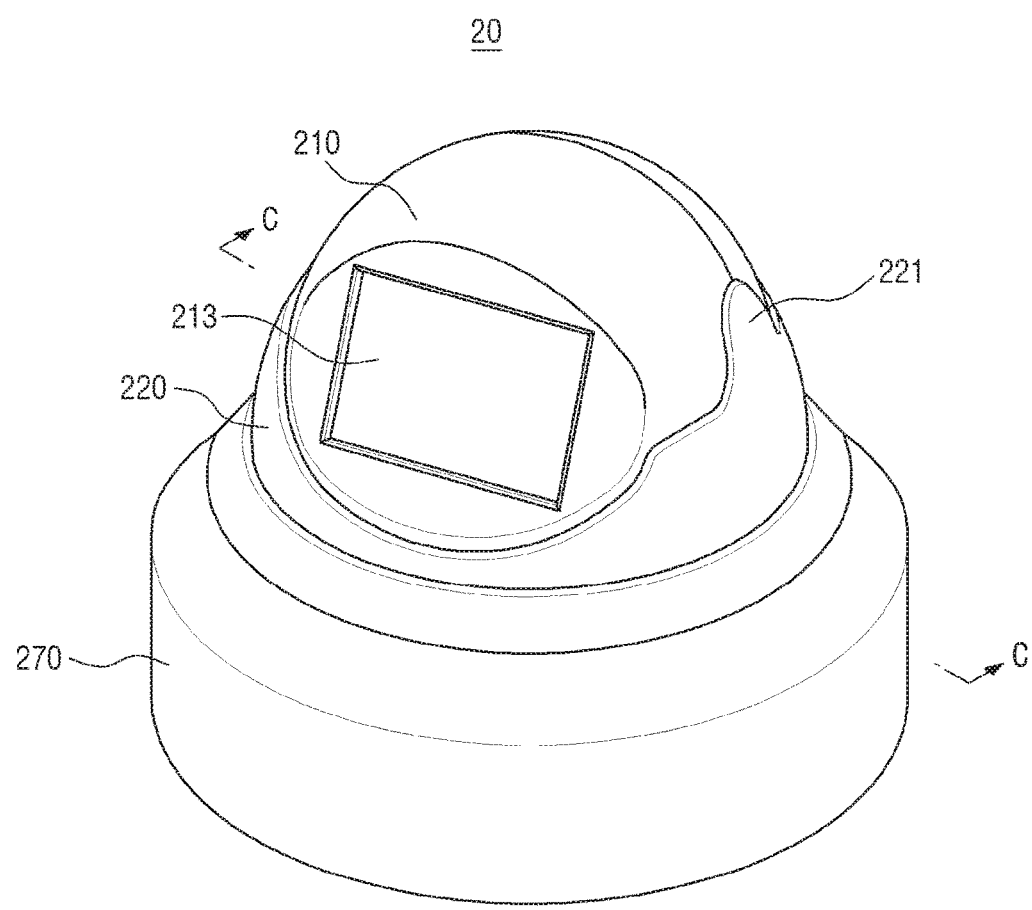
FIG. 7 is a perspective view of a dome camera device according to another exemplary embodiment.

FIG. 7 is a perspective view of a dome camera device according to another exemplary embodiment.

Figure 8:
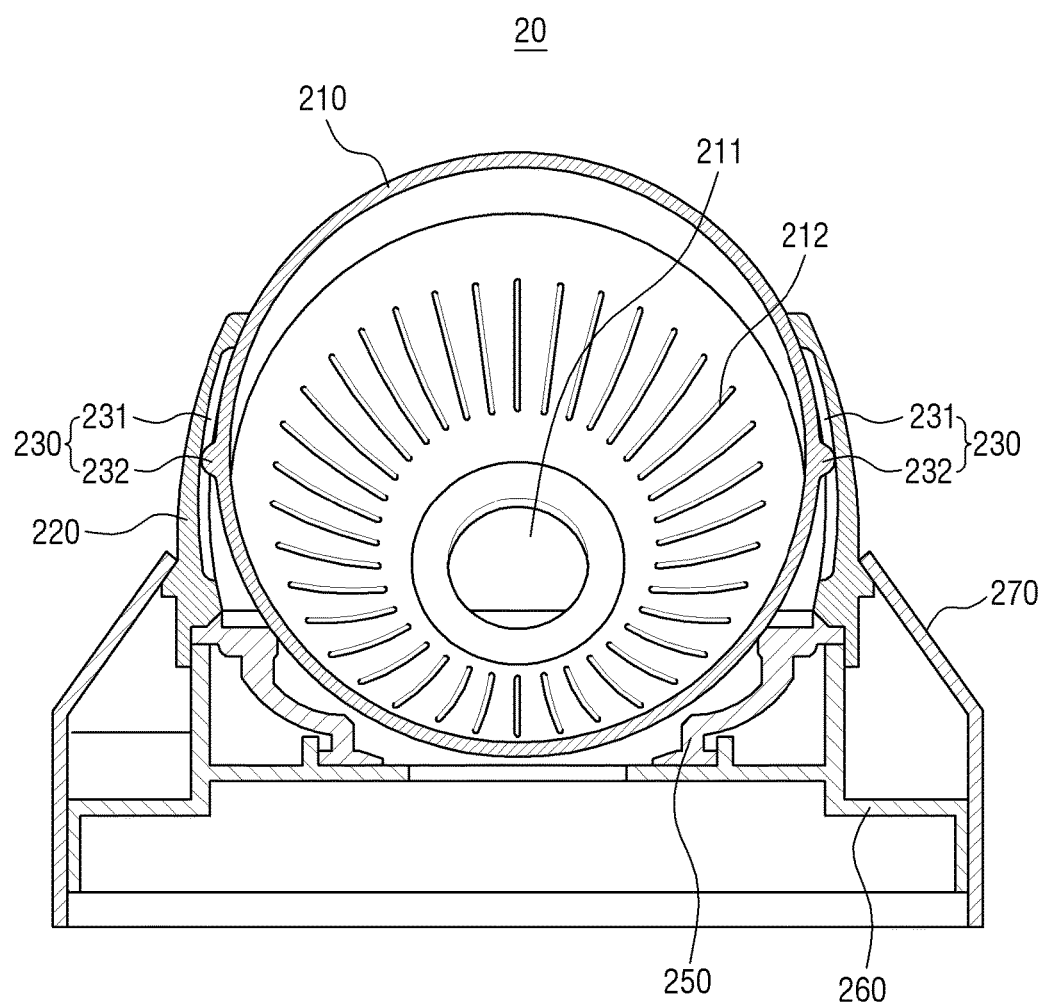
FIG. 8 is a cross-sectional view of section C-C of a dome camera device of FIG. 7.

FIG. 8 is a cross-sectional view of section C-C of a dome camera device of FIG. 7.

In FIGS. 7 and 8, a detailed description of components substantially identical to those described above with reference to FIGS. 1 through 4 will be omitted.

Referring to FIGS. 7 and 8, the dome camera device 20 may include a housing part 210, a connection cover part 220, and a first rotation restricting part 230. In addition, the dome camera device 20 may further include a rotation driving part 250, a base frame part 260, and a base cover part 270.

The connection cover part 220 may include an extension portion 221 extending in a first rotation direction on both sides of the connection cover part 220. The extension portion 221 may partially cover both sides of the housing part 210.

The first rotation restricting part 230 may limit the rotation range of the housing part 21 in the first rotation direction. The first rotation restricting part 230 may include a guide slot 231 and a guide protrusion 232.

The guide slot 231 may be located on both sides of the connection cover part 220. The guide slot 231 may be formed in an inner surface of the connection cover part 220 along the first rotation direction, and at least part of the guide slot 231 may be formed in the extension portion 221.

The guide protrusion 232 may be formed on the housing part 210 at a position corresponding to the guide slot 231 such that and a guide protrusion 232 may be inserted into the guide slot 231 in a slidable manner. For example, the guide protrusion 232 may be located on both sides of the housing part 210. In addition, the guide protrusion 232 may protrude from an outer surface of the housing part 210 and is inserted into the guide slot 231. Accordingly, the guide protrusion 232 can limit the rotation range of the housing part 210 in the first rotation direction to the length of the guide slot 231.

Here, the computer-readable recording medium may be achieved in the form of magnetic medium such as a ROM, a floppy disk and hard disk, an optical media such as a CD and a DVD.

Further, the computer-readable recording medium is dispersed into computer systems connected through a network, and a code readable by the computer in a distributed manner may be stored in the recording medium.

While the inventive concept has been particularly illustrated and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

The present inventive concept can prevent twisting of a cable connected to a dome camera device by limiting the rotation range of a housing part in which a camera is accommodated. Therefore, the inventive concept has a sufficient possibility of commercialization and sales and can be clearly implemented in reality. In this regard, the inventive concept is industrially applicable.

What is claimed is:

1. A dome camera device comprising:
a housing part configured to accommodate a camera and rotate in multiple directions including a first direction;
a connection cover part configured to cover at least part of the housing part;
a first rotation restricting part configured to limit a first rotation range of the housing part in the first rotation direction,
wherein the first rotation restricting part includes a guide slot formed in an outermost surface of the housing part, wherein the guide slot extends along the first rotation direction and is shaped to limit a rotation of the housing part in the first direction to the first rotation range.

2. The dome camera device of claim 1, wherein the first rotation restricting part comprises:
the guide slot which is formed on the housing part along the first rotation direction; and
a guide protrusion which protrudes from an inner side of the connection cover part and is inserted into the guide slot in a slidable manner.

3. The dome camera device of claim 2, wherein the first rotation restricting part further comprises a step portion comprising protrusions formed respectively at both ends of the guide slot.

4. The dome camera device of claim 3, wherein the guide slot comprises two slots formed respectively on opposite sides of the housing part, and
wherein the guide protrusion comprises two protrusions formed respectively on opposite sides of the connection cover part.

5. The dome camera device of claim 3, wherein the step portion extends outward from the housing part.

6. The dome camera device of claim 1, wherein the first rotation restricting part comprises:
the guide slot which is formed on the connection cover part along the first rotation direction; and
a guide protrusion which protrudes from an outer side of the housing part and is inserted into the guide slot in a slidable manner.

7. The dome camera device of claim 6, wherein the first rotation restricting part comprises a step portion comprising protrusions formed respectively at both ends of the guide slot.

8. The dome camera device of claim 1, further comprising:
a base cover part configured to cover at least part of the connection cover part; and
a base frame part covered by the base cover part and configured to support the connection cover part.

9. The dome camera device of claim 8, wherein a movable groove is formed in an inner surface of the base cover part along a third rotation direction.

10. The dome camera device of claim 9, wherein a movable protrusion is formed on an outer surface of the connection cover part and is inserted into the movable groove in a slidable manner.

11. The dome camera device of claim 1, further comprising a rotation driving part which is configured to rotate the housing part in at least one of the first rotation direction and the second rotation direction.

12. The dome camera device of claim 11, wherein the rotation driving part comprises a recessed portion into which the housing part is inserted.

13. The dome camera device of claim 11, wherein a fixing protrusion extending outwards is formed on a circumference of the rotation driving part.

14. The dome camera device of claim 13, wherein the connection cover part comprises a fixing groove into which the fixing protrusion is inserted, thereby coupling the rotation driving part to the connection cover part.

15. The dome camera device of claim 1, wherein the housing part forms a cable connection hole through which a cable connected to the camera penetrates.

16. The dome camera device of claim 1, wherein heat dissipation holes are formed on the housing part such that heat generated by the camera is dissipated.

17. The dome camera device of claim 1, further comprising a second rotation restricting part configured to limit a second rotation range of the housing part in a second rotation direction, the second rotation direction being one of the multiple directions the housing part is configured to rotate.

18. The dome camera device of claim 17, wherein the second rotation restricting part comprises:
stoppers which are spaced apart and protrude from a rear surface of the housing part; and
stopping protrusions configured to respectively catch the stoppers such that the housing part does not rotate in the second direction beyond the second rotation range.

19. The dome camera device of claim 18, wherein the stoppers comprise a first stopper which limits a range of forward rotation of the housing part rotating in the second rotation direction and a second stopper which is separated from the first stopper and limits a range of reverse rotation of the housing part rotating in the second direction.

20. The dome camera device of claim 19, wherein the stopping protrusions comprise:
a first stopping protrusion which is disposed at a front of the connection cover part and configured to catch the first stopper; and
a second stopping protrusion which is disposed at a rear of the connection cover part and configured to catch the second stopper.

21. The dome camera device of claim 1, wherein the outermost surface of the housing part is further configured to have a spherical shape and a transparent window at a position corresponding to a lens of the camera, and the guide slot is formed in an outermost spherical surface of the housing part.

22. A dome camera device comprising:
a housing part configured to accommodate a camera and rotate in multiple directions;
a connection cover part configured to cover at least part of the housing part;
a first rotation restricting part configured to limit a rotation range of the housing part in a first rotation direction; and
a second rotation restricting part configured to limit a rotation range of the housing part in a second rotation direction,
wherein the first rotation restricting part comprises:
a guide slot which is formed on the housing part along the first rotation direction; and
a guide protrusion which protrudes from an inner side of the connection cover part and is Inserted into the guide slot in a slidable manner,
wherein the first rotation restricting part further comprises a step portion comprising protrusions formed respectively at both ends of the guide slot,
wherein the guide slot comprises two slots formed respectively on opposite sides of the housing part,
wherein the guide protrusion comprises two protrusions formed respectively on opposite sides of the connection cover part,
wherein a virtual line connecting the protrusions of the guide protrusion crosses a rotation axis of the housing part rotating in the first rotation direction.

23. A dome camera device comprising:
a housing part configured to accommodate a camera and rotate in multiple directions including a first direction;
a connection cover part configured to cover at least part of the housing part;
a first rotation restricting part configured to limit a first rotation range of the housing part in the first rotation direction,
wherein the housing part is further configured to have a spherical shape and a transparent window at a position corresponding to a lens of the camera, and
wherein the first rotation restricting part comprises:
a guide slot which Is formed on the housing part along the first rotation direction.

* * * * *